(12) United States Patent
Modera

(10) Patent No.: US 10,094,734 B2
(45) Date of Patent: Oct. 9, 2018

(54) METHODS FOR DETECTION, MARKING AND SEALING LEAKS IN PIPES OR DUCTS

(71) Applicant: THE REGENTS OF THE UNIVERSITY OF CALIFORNIA, Oakland, CA (US)

(72) Inventor: Mark Modera, Piedmont, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 15/276,520

(22) Filed: Sep. 26, 2016

(65) Prior Publication Data

US 2017/0074746 A1    Mar. 16, 2017

Related U.S. Application Data

(63) Continuation of application No. PCT/US2015/023178, filed on Mar. 27, 2015.
(Continued)

(51) Int. Cl.
*F16L 55/18* (2006.01)
*G01M 3/22* (2006.01)
(Continued)

(52) U.S. Cl.
CPC ......... *G01M 3/222* (2013.01); *F16L 55/1003* (2013.01); *F16L 55/164* (2013.01); *G01M 3/22* (2013.01)

(58) Field of Classification Search
CPC ..... G01M 3/222; G01M 3/22; F16L 55/1003; F16L 55/164
(Continued)

(56) References Cited

U.S. PATENT DOCUMENTS 3,472,285 A * 10/1969 Ginsburgh ............ F16L 55/164
137/15.11
3,772,113 A * 11/1973 Patrick ................... C08G 18/10
138/97
(Continued)

FOREIGN PATENT DOCUMENTS

CN   1723359 A   1/2006
EP   0793543     9/1997
WO   9614166     5/1996

OTHER PUBLICATIONS

United States Patent and Trademark Office (USPTO), International Search Report and Written Opinion, related PCT International Application No. PCT/US2015/023178, dated Jun. 25, 2015, pp. 1-7, with claims searched, pp. 8-11.
(Continued)

*Primary Examiner* — James Hook
(74) *Attorney, Agent, or Firm* — O'Banion & Ritchey LLP; John P. O'Banion

(57) ABSTRACT

A system and method for remote detection, marking and/or sealing leaks in pipe or duct networks are provided. Aerosolized sealant particles that have a surface tackiness that diminishes over time are introduced into the pipe interior. A pressure differential is created and the micron scale particles adhere to the leak edges and to other particles as they are brought to the leaks and then leave the gas streamlines. Control of particle size, drying rate and particle residence time in the pipe interior allows control over the treatment area so that leaks are sealed in the pipes without sealing purposeful openings such as pilot lights or gas valves. This control also produces seals in duct systems with minimal tack at the time the duct systems are returned to service. Particles that do not participate in the formation of a seal can be collected or flushed through the system.

24 Claims, 2 Drawing Sheets

Related U.S. Application Data

(60) Provisional application No. 61/971,108, filed on Mar. 27, 2014.

(51) Int. Cl.
*F16L 55/10* (2006.01)
*F16L 55/164* (2006.01)

(58) Field of Classification Search
USPC .......................................... 138/104, 97, 98
See application file for complete search history.

(56) References Cited

U.S. PATENT DOCUMENTS

| | | | | |
|---|---|---|---|---|
| 4,267,307 | A | * 5/1981 | Louthan | C08G 75/14 |
| | | | | 525/438 |
| 4,331,722 | A | 5/1982 | Packo | |
| 4,419,163 | A | * 12/1983 | Yamamoto | F16L 55/164 |
| | | | | 138/97 |
| 4,439,561 | A | * 3/1984 | Barber | C09K 3/12 |
| | | | | 106/33 |
| 4,487,707 | A | * 12/1984 | Holzknecht | C09K 3/12 |
| | | | | 106/33 |
| 4,572,846 | A | 2/1986 | Foss | |
| 4,612,798 | A | 9/1986 | Roberts | |
| 4,635,469 | A | 1/1987 | Madera et al. | |
| 4,768,561 | A | * 9/1988 | Hyodo | B05D 7/222 |
| | | | | 137/15.08 |
| 4,994,307 | A | 2/1991 | Price | |
| 5,522,930 | A | * 6/1996 | Modera | B05B 7/0075 |
| | | | | 118/317 |
| 5,980,984 | A | 11/1999 | Modera et al. | |
| 6,492,024 | B1 | 10/2002 | Walter | |
| 6,767,395 | B2 * | 7/2004 | Erick | C09K 3/12 |
| | | | | 106/33 |
| 6,923,072 | B2 | 8/2005 | Modera et al. | |
| 7,156,320 | B2 | 1/2007 | Wang et al. | |
| 7,174,791 | B2 | 2/2007 | Modera et al. | |
| 7,631,666 | B1 | 12/2009 | Ng | |
| 7,851,017 | B2 | 12/2010 | Wang et al. | |
| 8,015,998 | B2 | 9/2011 | Harris | |
| 9,631,726 | B2 | 4/2017 | Sabotta | |
| 9,738,798 | B2 | 8/2017 | Perstnev | |
| 2003/0138558 | A1 | 7/2003 | Wang et al. | |
| 2005/0284530 | A1 * | 12/2005 | McEwan | F16L 55/164 |
| | | | | 138/97 |
| 2011/0293825 | A1 | 12/2011 | Atwal et al. | |
| 2012/0067447 | A1 * | 3/2012 | Ryan | E21B 29/10 |
| | | | | 138/97 |
| 2016/0178107 | A1 * | 6/2016 | Cacciabeve et al. | |
| | | | | F16L 55/164 |
| | | | | 138/97 |
| 2017/0073962 | A1 | 3/2017 | Modera | |

OTHER PUBLICATIONS

United States Patent and Trademark Office (USPTO), International Search Report and Written Opinion, PCT International Application No. PCT/US2015/023119, dated Jun. 26, 2015, pp. 1-6, with claims searched, pp. 7-11.

European Patent Office (EPO), extended European search report dated Oct. 10, 2017, European application No. 1567697673, pp. 1-6, with claims searched, pp. 7-9.

European Patent Office (EPO), extended European search report dated Oct. 19, 2017, European application No. 15767999.4, pp. 1-8, with claims searched, pp. 9-11.

State Intellectual Property Office of the Peoples Republic of China (SIPO), First Review Opinion Notice, dated Apr. 23, 2018, related Chinese patent application No. 201580015734.X, pp. 1-7, machine translation, pp. 8-13, claims examined, pp. 14-17.

* cited by examiner

10

20 — Formulate a Sealant Composition of a Sealant and Optionally at Least One Solvent and an Indicator Material 30 — Create a Pressure Differential Between the Interior And Exterior of The Pipe or Duct 40 — Flow an Aerosol of Sealant Particles that Have an Outer Surface With a Tack Range That Diminishes Over Time in the Interior of The Pipe or Duct 50 — Sealant Particles Flowing Out of Enclosure Leaks Adhere to Surfaces Adjacent to the Leak As Well As Other Particles to Form a Seal 60 — Optionally Generate a Second or Third Aerosol of Particles in the Pipe or Duct 70 — Optionally Monitor Pressure Differential of the Enclosure to Determine if there are Leaks that are Too Large to Seal.

FIG. 1

METHODS FOR DETECTION, MARKING AND SEALING LEAKS IN PIPES OR DUCTS

CROSS-REFERENCE TO RELATED APPLICATIONS

This application is a 35 U.S.C. § 111(a) continuation of PCT international application number PCT/US2015/023178 filed on Mar. 27, 2015, incorporated herein by reference in its entirety, which claims priority to, and the benefit of, U.S. provisional patent application Ser. No. 61/971,108 filed on Mar. 27, 2014, incorporated herein by reference in its entirety. Priority is claimed to each of the foregoing applications.

The above-referenced PCT international application was published as PCT International Publication No. WO 2015/149023 on Oct. 1, 2015, which publication is incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

BACKGROUND

1. Technical Field

The present technology pertains generally to devices and methods of sealing small fissures or other leaks in pipe or duct systems, and more particularly to a remote sealing process that uses aerosolized sealant particles of a specific size range with surfaces that have a specific "tackiness retention" time or "temporal profile of tackiness" so the tack range of the outer surface of the particles diminishes over time and/or distance from the injection point.

2. Background

Delivery of combustable gases or liquids from the source to consumers is through a network of pipes, typically located below ground. Aging networks, which are normally made of cast iron or steel pipes, can develop small fissures or cracks in the pipe walls or joints. The appearance of these pin point leaks can be due to corrosion, pitting, improper installation, fatigue, joint-seal failure or mechanical damage from soil subsidance or heavy traffic.

Networks with porous pipes can allow gas to continuously escape over time creating potentially dangerous situations with gas accumulations and waste. According to 1988 estimates, approximately 1% of all natural gas used within the United States was lost to leaks in the gas transportation networks. The country's natural gas consumption in that same year was $18.1\times10^{12}$ cubic feet. Today, that same gas consumption is $23\times10^{12}$ cubic feet, and costs on the order of $6 per 1000 cubic feet. This translates to approximately $1.4 billion dollars worth of natural gas escaping the distribution system through leaks.

Since natural-gas pipelines are typically buried underground, they must be uncovered and accessed to conduct even minor repairs, which require tremendous manpower and resources. Given that many compressed-gas distribution systems run under paved roadways and under building foundations, access remains a large problem and may be an impossibility. Additionally, many urban areas have aging infrastructure in dire need of repairs. In some cases, these systems are over 100 years old, and leaking sections must be patched or removed by hand. Due to the high cost and invasive nature of these repairs, minor leakage is often left unrepaired for long periods of time, wasting energy in the form of lost natural gas as well as transport energy, and adding escaped natural gas to the atmosphere, increasing overall greenhouse-gas emissions. This is significant since natural gas has a greenhouse impact roughly 25 times that of $CO_2$.

Operators of older cast iron and steel distribution systems are routinely challenged to manage system leakage in a cost effective manner. As assets reach the point that replacement is warranted, it becomes more cost effective to replace sections of pipe versus repairing leaks. Due to public safety or the time required to plan and coordinate pipe replacement, it is very common for utilities to expend significant amounts of money to repair leaks on pipes that will ultimately be replaced.

Repair of underground pipelines generally involves exposing the pipeline and replacing the leaking section of pipe or joint with a new section or joint. One alternative is to essentially shrink-wrap the joint from the outside, which still requires excavation. Moreover, it can be quite difficult to precisely determine the location of leaks within a network of pipes. Rather than close down the pipeline to replace pipes that do not leak or where the location of the leak is uncertain, the outside surfaces of pipes may be coated with a polymeric coating such as polyurethane or other material coating in an attempt to seal small fissures as a temporary remedy. This strategy also requires excavation.

It is also very difficult to seal leaks remotely in a cost-effective manner. This is particularly important for low and medium pressure pipes with a large number of joints between sections.

Accordingly, there is a need for a method of identifying and repairing leaks in pipeline networks that does not require excavation and does not require normal pipeline distribution to be interrupted for any significant amount of time. The present technology satisfies these needs and is a significant improvement in the art.

BRIEF SUMMARY

A system and method for detecting, marking and/or sealing leaks in pipelines or duct networks are provided that can be used for the remote sealing of low and medium pressure compressed-gas systems, repairing gas leaks in aging natural-gas distribution infrastructures, as well as sealing leaks in duct networks.

The method produces and introduces aerosolized sealants into the pipe or duct network that are tailored for remote deposition at small leaks such as pitting holes or joints. A pressure differential is created and the aerosol particles are suspended within an air or gas stream in the pipes and do not deposit substantially on pipe surfaces until they reach the leaks.

The leaks themselves result in small pressure drops across the pipe's exterior, driving the aerosols into the correct location for sealing. At the leak site, the suspended particles leave the air stream in the interior of the pipe and are deposited at the leak edges and then to each other until the leaks are closed.

The aerosol particles are kept suspended in the air stream long enough for them to reach the leaks and then leave the air stream and impact the sides of the leaks as the stream exits the pipe leak. This is accomplished by the right combination of duct flow, duct pressure, and particle size. In general terms, the aerosol particles leave the airstream at the leaks due to their velocity (created by the duct pressure) and inertia (determined by particle size and density). The flow regime in the pipe interior determines whether the particles fall out by gravity, are flung against the sides of the pipe by turbulence, or are kept reasonably suspended within the airstream. The size of the particles affects both their ability to be transported through the pipe, and their tendency to leave the airstream at the leaks.

One embodiment uses the preferential deposition of aerosol marking particles at leak sites for marking and detecting the location and size of the leaks. In another embodiment, the marking particles will not only indicate the site of a leak but will also seal the leak.

The sealant aerosols also cure on time frames that facilitate adhesion and cohesion at the leak sites, but lose their surface tack over a pre-determined period of time and/or distance into the pipe/duct network. In one embodiment, this is accomplished by tuning particles such that they that lose their surface tackiness (or ability to seal) prior to reaching components that should not be sealed. In one embodiment, this is accomplished by drying time versus residence time, or by using particles that will not dry or stick well at the points that should not be sealed at a distance from the point of insertion of the particles.

Aerosol particles that are not ultimately involved in the sealing or marking of the leaks can be captured in a filter or allowed to exit the pipes or ducts. In one embodiment, the sealing materials that are selected may be non-toxic to end energy consumers, so that non-deposited sealant aerosols can safely exit the system without consequence.

In one embodiment, the process allows repairs without service disruption by using the existing gas or air in the pipes to move the aerosol particles through the interior of the pipe at a desired rate. The sealant aerosol can be introduced from easily accessible entry points, and the compressed gas will aid in carrying the material through the system. This will allow the distribution system to be put back into service quickly. In appropriate cases, it may be possible for the distribution system to remain in use during the sealing process.

Control over the materials selected and the aerosol formation process will determine the characteristics of the sealant particles. The environmental conditions of the interior of the pipeline can also influence the duration of the aerosol particle surface tack. According to one aspect of the present technology, a method is provided where the combination of particle size, particle tackiness, and particle drying rate versus residence time can be controlled. A corollary to this is that the sealant can be tuned to lose its tackiness after a certain time or distance prior to reaching the distribution system components that should not be sealed. For example, the formation of particles that lose their tackiness after a certain time or distance avoids the the possibility of sealing purposeful openings such as pilot lights or gas valves.

Monitoring of the pressure differential across the pipe or ducts will permit an evaluation of the progress of the sealing process as well as to determine whether there are leaks that are too large to seal.

Control over the process parameters will produce aerosol particles that are in the proper size range and provide a gas or air flow within the proper flow range so that a majority of the particles remain suspended in the interior of the pipes until the point that they encounter leaks. Moreover, the interior pipe pressure can be maintained within the proper range such that a substantial fraction of the particles leave the airstream and deposit on the leak walls as the airstream exits through the leak.

On the other hand, for marking applications the particles do not necessarily need to seal the leak to provide the desired results. The correct combination of particle size, drying rate and particle residence time and distance over velocity can be achieved to mark the site of the leak for leak assessment and for other remedial approaches.

Another aspect of the methods is the combination of preferential deposition at leaks with the use of a sealant material that can be detected either from the inside or the outside of the pipe. The sealant composition may also include an indicator or marker material that will allow visualization or detection of the sealant material that has been deposited. For example, an indicator material that can be observed visually, such as a colored dye solid or fiber, or observable by exposure to infra-red or ultra-violet light such as phosphorescent or fluorescent materials can be employed. As an example, a gas pipeline can be injected with particles that fluoresce, either during normal operation, or after the pipeline is isolated, and then a light and video camera can be moved through the pipe, providing a visual depiction of the pattern of particle deposition within the pipe.

Alternatively, the particles employed can exhibit some other characteristic that makes the leak detectable either from the inside or the outside of the pipe. For example, the deposited particles can produce an emission, or have a unique atomic signature that makes their location observable from inside or outside of the pipe or duct such as by detection of electromagnetic radiation, or MRI. For example, the particles can serve as miniature transmitters. In another embodiment, the particles can be detected externally by some other physical or chemical means. Still another embodiment involves externally detecting particles that have exited the pipe through the leaks and have been deposited on the soil surrounding the leak site.

Further aspects of the technology will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWINGS

The technology described herein will be more fully understood by reference to the following drawings which are for illustrative purposes only:

FIG. 1 is a flow diagram of a method for sealing or marking fissures and other leaks in pipes or ducts with particles that have a tack that diminishes over time according to one embodiment of the technology.

DETAILED DESCRIPTION

Figure 2:
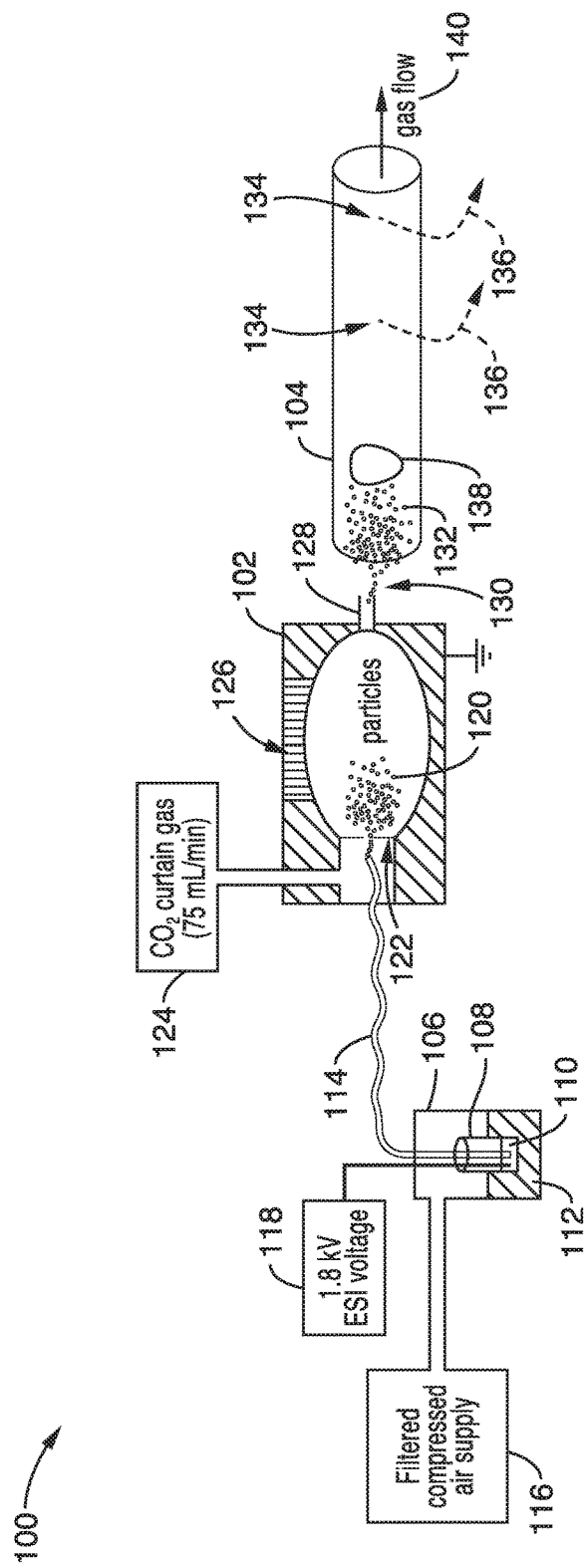
FIG. 2 is a schematic view of one embodiment of an aerosol particle generating and distributing apparatus that allows control over the characteristics of the generated particles.

Referring more specifically to the drawings, for illustrative purposes, embodiments of the apparatus and methods for the remote sealing of pipes or ducts in low and medium pressure gas systems to prevent gas leaks in aging infrastructures such as duct systems, or compressed-air and natural-gas distribution systems are shown. One embodiment of the technology is described generally in FIG. 1 to illustrate the methods and an embodiment of the apparatus is depicted generally in FIG. 2. It will be appreciated that the methods may vary as to the specific steps and sequence and the apparatus may vary as to structural details without departing from the basic concepts as disclosed herein. The method steps are merely exemplary of the order that these steps may occur. The steps may occur in any order that is desired, such that it still performs the goals of the claimed technology.

Turning now to FIG. 1, one method 10 for sealing pipes using aerosolized sealants that are tailored for remote deposition within a pipe system at small leaks such as pitting holes is shown. The method generally uses sealant aerosols that cure on time frames that facilitate adhesion and cohesion only at leak sites requiring sealing at selected distances from the aerosol point of entry leaving small diameter lines or other ducts or valves unsealed. It may even be possible for the gas distribution system to remain in use during sealing or be put back in service quickly after the sealing procedure. High strength adhesive materials may also be used that are non-toxic and non-fouling at the point of end-user combustion.

At block 20 of method 10, the sealant composition is selected and acquired. The sealant composition may be a sealant material alone or can be mixed with one or more solvents. The sealant composition may also include one or more types of marker or indicator materials. The selection of the sealant material may be influenced by the normal line pressure of the pipe and the composition of the pipe so that the final seal is strong enough to maintain the seal.

Suitable sealants can be atomized and the atomized sealant particles can adhere to the edges of a leak and to each other to form a seal. Preferred sealants include various compounds that can either have good elongation properties after drying and/or can provide rigid solid seals that can have structural properties. One example of sealants that work well is water-based acrylic polymer sealants. Other additives include white mineral oil, amorphous silica or titanium dioxide, each 1.0-5.0% by weight. In one embodiment, the selected sealant is a naturally-occurring sealing material that is carbon-based and would not foul the final end-user combustion systems such as furnaces and appliances.

The sealant composition that is formulated at block 20 may optionally include one or more solvents that can facilitate the aerosolization process and produce sealant particles of a desired size or within a range of sizes. The selection of the optional solvents that are available for use will be influenced by the sealant that is selected and on its volatility. This selection of sealants and solvents also allows temporal control over the tack range of the aerosolized sealant particles. Some examples of sealant modifications that have been shown to increase the duration of tackiness include the addition of acetone or p-chlorobenzotrifluride, or the use of an acrylic polymer that has no rheological fillers.

The availability of optional solvents for use will be influenced by the sealant that is selected and on its volatility. This selection of sealants and solvents allows temporal control over the tack range of the aerosolized sealant particles. Some examples of sealant modifications that have been shown to increase the duration of tackiness include the addition of acetone or p-chlorobenzotrifluride, or the use of an acrylic polymer that has no rheological fillers.

Solvents can be aqueous or organic. Preferred solvents include water, acetone and p-chlorobenzotrifluride. The characteristics of the aerosolized sealant particles will also be influenced by the percentage of sealant to solvent in the final sealant composition. The preferred sealant compositions have roughly 20% to roughly 25% solids. In another embodiment, the sealant composition has between approximately 10% to approximately 35% solids. However, if the atomizer that is used is capable of creating small particles the sealant composition can be up to approximately 70% solids, or if very small particles are desired, as little as approximately 5% solids can be utilized.

The sealant composition may also include an indicator or marker material that will allow visualization or detection of the sealant material that has been deposited. For example, the indicator material that is part of the sealant composition can be observed visually, such as a colored dye, solid or fiber, or observable by exposure to infra-red or ultra-violet light such as phosphorescent or fluorescent materials. Alternatively, the deposited particles can produce an emission, or have a unique atomic signature that makes their location observable from inside or outside of the pipe such as by detection of electromagnetic radiation, or MRI.

Once the sealant and optional solvent and marker materials have been selected for use at block 20 of FIG. 1, the section or system of pipes are closed off so that a pressure differential can be created within the pipes at block 30. The pressure differential that is created within the pipes compared to the pressure outside of the pipes generates a flow of air or gas from the interior to the exterior through the leaks in the pipes.

The preferred pressure differential across the pipe or duct is within a specific range of between approximately 10 Pa and approximately 10,000 Pa. A pressure differential between approximately 25 Pa and approximately 200 Pa is also preferred and a pressure differential between approximately 50 Pa and approximately 150 Pa is particularly preferred for duct systems. The preferred pressure differential decreases as the size of the particles increases.

At block 40, an aerosol of sealant particles is generated and injected into the pipe of a system of pipes. The sealant particles can be injected into a pressurized pipe as at block 30 or they can be injected into the pipe and then the pressure differential can be created thereafter. The sealant particles can also be introduced at multiple locations within the pipe or duct system.

Sealing can be performed with polydisperse aerosols with a particle size range from approximately 0.5 micron to 30 microns in diameter. Injectors can also use compressed air nozzles or airless nozzles to disperse aerosols in the interior of the pipes or ducts. The preferred particle size depends upon the application. Smaller diameter pipes or ducts, and longer pipes or ducts generally require smaller particle sizes. The aerosol particles generally are reduced in size after formation as solvents evaporate, with the size derivative depending on the rate of evaporation, and therefore environmental conditions.

The sealant particles are formed to have an outer surface that has a tack that diminishes over time. By definition, tack is a propensity of a material to adhere instantaneously to a surface with a bond of measurable strength when it is brought in contact with the surface with very light pressure. Tack range is defined as the period of time that the particle surface has a tack bond state that will adhere to leak surfaces and other particles to form a seal.

Tackiness at the time of contact of the particles at the leak site can be described by the adhesive and cohesive properties of the sealant. These properties can be regulated to have desired characteristics at a certain distance from or time from leaving the aerosol injector. The time and distance are related by the velocity of the carrier gas in the pipe or duct.

For example, the tack range timeframe can be increased or decreased with the proper selection of at least one solvent to go along with the sealant material that is selected. Control over tackiness versus time can also be exerted, in part, by controlling the humidity and temperature during the injection period so as to control the evaporation of the solvent from the sealant.

The surface properties of the aerosol particles can be controlled with the selection of sealant composition, including the presence and concentration of solvents, as well as the range of particle sizes that are produced and the environment of the interior of the pipes. Environmental control of the area surrounding the aerosol particle generator as well as the interior of the pipe system to be treated can include control over the temperature, dew point, absolute humidity, relative humidity or partial pressure alone or in combination. Control over aspects of the environment of the pipe or duct interior or external atomization space of the particle generator will also allow some control over the solvent evaporation and the diameter of the sealant particles encountering the leaks. For example, the relative humidity in the external atomization space or the interior of the pipes is preferably controlled to be within the range of approximately 65% RH to approximately 95% RH. The relative temperature in the pipe network or external atomization space is preferably controlled to be within the range of approximately 40° F. and approximately 110° F.

Control of the temperature impacts the relative humidity and therefore the evaporation rate. In another embodiment, the dew point, absolute humidity or partial pressure are the conditions that are controlled instead of relative humidity.

By selecting the parameters of the elements carefully, it is possible to temporally control the tack of the aerosol particles to have a desired approximate duration. Aerosol particles essentially have a "tackiness" lifespan and the particles will no longer adhere to surfaces or to each other after a period of time. Therefore, flow control of the aerosol particles and the temporal control over the tack of the particles will allow control over the distance along the length of the pipe where the particles will stick to a leak and where the particles will not stick. In general, it is preferred to have the tackiness of the particles dissipate prior to putting a duct system back in service, however, the need for this is reduced in natural gas or compressed-air systems.

Sealant particles that have been injected flow through the pipe at block 50 and respond to the pressure differential and flow that is caused by a leak and adhere to the surfaces surrounding the leak and to other particles to form a seal over time. Because a differential pressure has been created between the pipe/duct and its surroundings, the pressurized interior gas will flow out of any leaks through seams, joints, or any other openings. The aerosol particles in the fog are entrained in the flow moving out through the leaks, and leave the streamlines of that flow due to particle inertia. Since the aerosol particles are sufficiently small to move with the air at low acceleration rates, they are drawn to the leaks with the air. However, the higher acceleration rates associated with the accelerated flow created by the pressure differential maintained across the leaks causes the particles to leave the streamlines near the leak, thereby impacting and adhering to the leak edges and to other particles previously deposited, gradually building up to form a seal.

Air and liquid flow rate through the nozzles can be used to adjust the size of the particles forming the injected aerosol. If the sealant particles are too big then they will be lost on the walls of the pipe or duct prior to reaching the leaks. If the aerosol particles are too small, then the particles will go through the leaks with the air stream and not form a seal.

At block 60, a second or third flow of sealant particles are optionally injected into the pipe system sequentially or in close succession to form an aerosol with a mixture of different sized particles or different materials. In one embodiment, the second flow of sealant particles has a mean diameter that is less than the mean diameter of the first flow of sealant particles.

The second and third flow of sealant particles can also be formed from a different material than selected for the first flow of sealant particles. In one embodiment, the second flow is made of or includes a material such as a marker. The third flow is a flow of the same or different type of sealant as the first flow of particles that coats the particles of the second flow.

It can be seen that a wide variety of materials can be aerosolized and deposited at leak sites throughout the system of pipes that are treated. The second or third flow of aerosol particles can include materials such as curative agents, cross linking agents, polymers or materials with micro-scale or nano-scale metal particles.

The pressure differential between the interior and exterior of the pipe system to be treated can be monitored throughout the process at block 70. Monitoring of the overall or localized pressure differential over time can indicate whether there are leaks in the pipes that are too large to seal and the sealant can act as a marker or indicator of the location of the leak for other remedial action. Pressure differential monitoring may also assist in the determination of whether additional flows of sealant particles are necessary and the size of the particles that should be used to complete or reinforce the seal at the leak site. The pressure differential monitoring can also be graphed and displayed. The need for an increase or decrease in the internal pressure of the pipe system can also be assisted by pressure differential monitoring.

Turning now to FIG. 2, an apparatus 100 for performing the aerosol based remote sealing of gas leaks is schematically shown. The apparatus 100, has an aerosol particle generator and injector 102 that is configured to produce aerosol particles 130 and inject them into a pipe system 104.

Generally, leaks 134 are sealed from the interior of the pipe 104 by releasing aerosolized particulates 130 composed of sealant materials into the lumen of the pipe distribution system. Various techniques can be used to produce the aerosol. However, the aerosol particle generator and injector 102 illustrated in FIG. 2 has a particle generator section that has a pressure chamber 106 that contains a reservoir 108 that contains the sealant composition 110 to be atomized. The sealant reservoir 108 may sit in a fluid bath 112. The pressure chamber 106 has a compressed gas or air supply 116 that allows control over the pressure within the pressure chamber 106. The air supply 116 is a 1-2 PSI filtered compressed air supply in the embodiment shown in FIG. 2.

The pressure chamber 106 also has a voltage source 118 that is connected to the sealant reservoir 108 and sealant composition material 110. A particle emitting tube 114 is disposed within the sealant composition 110 in the pressure chamber 106 on one end and attached to the injector portion at the other end. A suitable particle emitting tube 114 may be a 50 μm silica capillary tube.

The injector portion of the particle generator and injector 102 has a source of curtain gas 124 such as $CO_2$ and an orifice plate 122 that separates and moves properly sized particles 120 from the particle emitter tube 114 through the orifice plate 122 and into the injector chamber and out of nozzle 128. In the embodiment shown in FIG. 2, an optional heating element 126 is provided to heat the environment in the injector chamber to provide some control over the particle surface tack and solvent evaporation.

The characteristics of the aerosol particles 130 that are injected by nozzle 128 into pipe 104 are also influenced by the environment (i.e. temperature and humidity) in the interior of the pipe 104 system which can also be controlled with a heated or cooled carrier gas.

Accordingly, the apparatus allows control over the size and surface characteristics of the injected particles as well as the rate of flow of injected particles 132 through the interior of pipe 104. The apparatus also allows control over the pressure differential in the pipe system so that the draw from air/gas streams 136 from the leaks 134 to the exterior of the pipe can be controlled. Furthermore, control over the tack surface characteristics of the particles, the flow rate of particles 132 through the pipe 104 system and the pressure differential will provide control over the linear distance of treatment and will permit the pipes to be treated in sections.

When properly optimized, the sealant materials 132 will travel innocuously through the pressurized flow-driven system, and lodge on the edges of the leaks 134. The sealant materials will be tuned to cure on a time scale so that they build small internal plaques 138 over the leaks that can withstand high pressures. The particle sizes can also be tuned so that non-depositing material will safely exit the pressurized system along with the normal gas flow 140.

The particles can be injected in either pressurized or de-pressurized pipes. In one embodiment, existing pressurized gas systems may be treated without emptying the pipes of gas. The sealant particles can normally be introduced to the pipe interior from easily accessible entry points, and that the existing compressed gas in the pressurized pipes will aid in carrying the material through the system. The leaks themselves result in small pressure drops across the pipe's exterior, driving the aerosols into the correct location for sealing. Once in place, the sealing materials will cure on time frames that are compatible with routine maintenance crew needs. Materials can also be selected so that they are non-toxic to end energy consumers, so that un-deposited sealant aerosols can safely exit the system without any consequences. In one embodiment, naturally-occurring sealing materials that are carbon-based are used so that the unused particles in the pipes will not foul the final end-user combustion systems such as boilers, furnaces and appliances. Hence the process can allow pipe leak repairs without service disruption.

From the discussion above it will be appreciated that the technology described herein can be embodied in various ways, including the following:

1. A method of sealing leaks in pipes or ducts, the method comprising: (a) forming particles of a sealant, the particles having an outer surface with a tack range that diminishes over time; (b) creating a pressure differential between the interior and exterior of the pipes or ducts; (c) flowing the particles through the interior of leaky pipes or ducts; and (d) adhering sealant particles to surfaces adjacent to a leak and to other particles to form a seal; (e) wherein sealant particles that do not form a seal will not adhere to interior surfaces of the pipe or duct or to other particles after a period of time or after a certain distance from the particle injection point.

2. The method of any preceding embodiment, further comprising: controlling the tack range of the sealant particles by controlling the temperature and humidity within the interior of the pipe or duct and controlling the particle size of the sealant particles.

3. The method of any preceding embodiment, wherein the relative temperature in the pipe or duct is controlled within the range of 40° F. to 110° F.

4. The method of any preceding embodiment, wherein the relative humidity in the pipe or duct is controlled within the range of 65% RH to 95% RH.

5. The method of any preceding embodiment, wherein the sealant particles have a mean particle diameter within the range of approximately 0.5 micron to approximately 30 microns.

6. The method of any preceding embodiment, further comprising: controlling the rate of flow of sealant particles through the pipe or duct to provide spatial control over which portions of the pipe or duct are sealed and which portions are not so that intentional openings are not sealed.

7. The method of any preceding embodiment, further comprising: purging remaining sealant particles from the pipe or duct with a flow of heated or cooled gas.

8. The method of any preceding embodiment, further comprising: monitoring the flow into and the pressure differential across the pipe or duct to determine if there are leaks that are too large to seal and the progress of the sealing process.

9. The method of any preceding embodiment, wherein the pressure differential in the pipe or duct is maintained within the range of approximately 10 Pa to approximately 10,000 Pa.

10. The method of any preceding embodiment, wherein the sealant composition comprises a composition of 5% to 70% solids to solution for aerosolization.

11. The method of any preceding embodiment, further comprising: formulating a sealant composition of a sealant and at least one solvent; and aerosolizing the sealant composition to produce the sealant particles.

12. The method of any preceding embodiment, wherein the solvent is selected from the group of solvents consisting of water, of acetone and p-chlorobenzotrifluride.

13. The method of any preceding embodiment, further comprising: formulating a sealant composition of at least one solvent, a sealant and an indicator; and aerosolizing the sealant composition to produce the sealant particles.

14. The method of any preceding embodiment, wherein the indicator is selected from the group consisting of colored dyes, colored fibers, fluorescent dyes and phosphorescent dyes, wherein the location of the seals in the pipe or duct are identified by the indicator.

15. The method of any preceding embodiment, further comprising: applying of an additional layer of sealant on leaks identified by the presence of the indicator.

16. A method of sealing leaks in pipes or ducts, the method comprising: (a) forming particles of a sealant and a solvent composition, the particles having an outer surface with a tack range that diminishes over time; (b) creating a pressure differential between the interior and exterior of the pipes or ducts; (c) flowing the particles through the interior of leaky pipes or ducts; and (d) adhering sealant particles to surfaces adjacent to a leak and to other particles to form a seal; and (e) monitoring the pressure differential across and flow into the pipe or duct to determine if there are leaks that are too large to seal and the progress of the sealing process; (f) wherein sealant particles that do not form a seal will not adhere to interior surfaces of the pipe or duct or to other particles after a period of time or after a certain distance from the particle injection point.

17. The method of any preceding embodiment, further comprising: controlling the tack range of the sealant particles with a solvent of low volatility.

18. The method of any preceding embodiment, further comprising: controlling the tack range of the sealant particles by controlling the relative humidity of the environment surrounding a source of sealant particles; and controlling the particle size of the sealant particles.

19. The method of any preceding embodiment, wherein the tack range of the sealant particles is 5 minutes to 1 hour.

20. The method of any preceding embodiment, wherein the pressure differential in the pipe or duct is maintained within the range of 10 Pa to 10,000 Pa.

21. A method of marking leaks in pipes or ducts, the method comprising: (a) formulating a sealant composition of at least one solvent, a sealant and an indicator; (b) aerosolizing the sealant composition to produce the sealant particles; (c) flowing sealant particles through the interior of leaky pipes or ducts; (d) creating a pressure differential between the interior and exterior of the pipes or ducts; (e) adhering sealant particles to surfaces adjacent to a leak and to other particles to mark a leak; (f) detecting marked leaks with a detector.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A method of sealing leaks in pipes or ducts, the method comprising:

(a) forming particles of a sealant, said particles having an outer surface with a tack range that diminishes over time;

(b) creating a pressure differential between the interior and exterior of the pipes or ducts;

(c) flowing said particles through the interior of leaky pipes or ducts; and (d) adhering sealant particles to surfaces adjacent to a leak and to other particles to form a seal;

(e) wherein sealant particles that do not form a seal will not adhere to interior surfaces of the pipe or duct or to other particles after a period of time or after a certain distance from the particle injection point.

2. The method of claim 1, further comprising controlling the tack range of said sealant particles by controlling the temperature and humidity within the interior of the pipe or duct and controlling the particle size of the sealant particles.

3. The method of claim 2, wherein the relative temperature in the pipe or duct is controlled within the range of approximately 40° F. to approximately 110° F.

4. The method of claim 2, wherein the relative humidity in the pipe or duct is controlled within the range of approximately 65% RH to approximately 95% RH.

5. The method of claim 2, wherein the sealant particles have a mean particle diameter within the range of approximately 0.5 micron to approximately 30microns.

6. The method of claim 1, further comprising controlling the rate of flow of sealant particles through the pipe or duct to provide spatial control over which portions of the pipe or duct are sealed and which portions are not so that intentional openings are not sealed.

7. The method of claim 1, further comprising purging remaining sealant particles from the pipe or duct with a flow of heated or cooled gas.

8. The method of claim 1, further comprising monitoring the flow into and the pressure differential across the pipe or duct to determine if there are leaks that are too large to seal and the progress of the sealing process.

9. The method of claim 1, wherein the pressure differential in the pipe or duct is maintained within the range of approximately 10 Pa to approximately 10,000 Pa.

10. The method of claim 1, wherein said sealant composition comprises a composition of approximately 5% to approximately 70% solids to solution for aerosolization.

11. The method of claim 1, further comprising:

formulating a sealant composition of a sealant and at least one solvent; and aerosolizing the sealant composition to produce said sealant particles.

12. The method of claim 11, wherein said solvent is selected from the group of solvents consisting of water, acetone and p-chlorobenzotrifluride.

13. The method of claim 1, further comprising:

formulating a sealant composition of at least one solvent, a sealant and an indicator; and aerosolizing the sealant composition to produce said sealant particles.

14. The method of claim 13, wherein said indicator is selected from the group consisting of colored dyes, colored fibers, fluorescent dyes and phosphorescent dyes, wherein the location of the seals in the pipe or duct are identified by the indicator.

15. The method of claim 14, further comprising applying an additional layer of sealant on leaks identified by the presence of the indicator.

16. A method of sealing leaks in pipes or ducts, the method comprising:

(a) forming particles of a sealant and a solvent composition, said particles having an outer surface with a tack range that diminishes over time;

(b) creating a pressure differential between the interior and exterior of the pipes or ducts;

(c) flowing said particles through the interior of leaky pipes or ducts;

(d) adhering sealant particles to surfaces adjacent to a leak and to other particles to form a seal; and (e) monitoring the pressure differential across the pipe and flow into the pipe or duct to determine if there are leaks that are too large to seal and to determine the progress of the sealing process;

(f) wherein sealant particles that do not form a seal will not adhere to interior surfaces of the pipe or duct or to other particles after a period of time or after a certain distance from the particle injection point.

17. The method of claim 16, further comprising controlling the tack range of said sealant particles with a solvent of low volatility.

18. The method of claim 16, further comprising:
controlling the tack range of said sealant particles by controlling the relative humidity of the environment surrounding a source of sealant particles; and
controlling the particle size of the sealant particles.

19. The method of claim 16, wherein said tack range of said sealant particles is approximately 5 minutes to approximately 1 hour.

20. The method of claim 16, wherein the pressure differential in the pipe or duct is maintained within the range of approximately 10 Pa to approximately 10,000 Pa.

21. A method of marking leaks in pipes or ducts, the method comprising:
(a) formulating a sealant composition of at least one solvent, a sealant and an indicator;
(b) aerosolizing the sealant composition to produce said sealant particles;
(c) flowing sealant particles through the interior of leaky pipes or ducts;
(d) creating a pressure differential between the interior and exterior of the pipes or ducts;
(e) adhering sealant particles to surfaces adjacent to a leak and to other particles to mark a leak; and
(f) detecting marked leaks with a detector.

22. The method of claim 21, wherein the indicator is a visual indicator comprising a colored dye solid or fiber.

23. The method of claim 21, wherein the indicator is a phosphorescent or fluorescent material observable by exposure to infra-red or ultra-violet light.

24. The method of claim 21, wherein the indicator is a material with a unique atomic signature detectable by magnetic resonance imaging.

* * * * *